United States Patent [19]

Iannelli

[11] Patent Number: 4,474,214

[45] Date of Patent: Oct. 2, 1984

[54] BEVERAGE MIXING AND DISPENSING VALVE

[76] Inventor: Frank M. Iannelli, 5215 Pogue St., Spartanburg, S.C. 29301

[21] Appl. No.: 414,384

[22] Filed: Sep. 2, 1982

[51] Int. Cl.³ .............................................. F16K 19/00

[52] U.S. Cl. .......................................... 137/635; 137/607; 137/614.17; 137/898; 251/121; 251/339

[58] Field of Search ................... 137/607, 635, 614.17, 137/898; 251/121, 122, 339

[56] References Cited

U.S. PATENT DOCUMENTS

| | | | |
|---|---|---|---|
| 3,167,090 | 1/1965 | Booth | 137/898 |
| 3,199,738 | 8/1965 | Cary | 137/898 X |
| 3,411,540 | 11/1968 | Iannelli | 137/607 X |
| 4,064,908 | 12/1977 | Loe | 137/614.17 |
| 4,311,170 | 1/1982 | Dolan | 137/614.17 |
| 4,313,466 | 2/1982 | Adams | 137/614.17 |

*Primary Examiner*—Robert G. Nilson
*Attorney, Agent, or Firm*—Julian W. Dority

[57] ABSTRACT

An improved carbonated beverage mixing and dispensing valve (A) is illustrated as including a housing (10) having an entrance port (16) for the admission of carbonated mixing water and valve outlets (22*a*) for admitting flavored syrups. A valve (B) is carried in the entrance port for controlling the flow of carbonated water which includes an adjustable metering rod (20) carried in an internal bore (104*a*) of valve stem (104) which may be adjusted externally of housing (10). Flow of syrup is controlled through valve outlet (22*a*) by means of flow control device (C) which includes a raised ridge (44*a*) and valve plunger (46) between which a section of valve tubing (22) is pinched off intermediate a valve inlet (30*a*) and valve outlet (22*a*). A single operator lever (92) operates both the valve (B) and flow control device (C) in a single action. A rotatable selector plate (62) carries a cam (D) having camming portions (72, 78, 74) which engage respective plunger heads (46*a, b, c, d*) to actuate any one of four plungers (46) and permit flow through a respective valve tube (22). Cam plate (D) includes position notches (82, 84, 86, 88) which correspond to plunger positions and cooperate with a post (90) carried by lever (92) to indicate and assure proper position of the selector plate/knob at a desired syrup selection and actuating position therefore. Pivoting of lever (92) to the dotted line position (92*b*) causes reciprocation and opening of valve (B) through engagement of valve stem (104) and lever end (92*a*) while a selected plunger is actuated by engagement of a plunger head and cam portion and axial movement of selector plate (62) by engagement with post (90) during pivoting of lever (92).

13 Claims, 6 Drawing Figures

BEVERAGE MIXING AND DISPENSING VALVE

BACKGROUND OF THE INVENTION

This invention relates to devices for mixing and dispensing beverages and in particular to dispensing carbonated beverages by mixing a flavored syrup and carbon dioxide and dispensing the mixture and to a valve device therefor.

Applicant's prior U.S. Pat. No. 3,411,540 discloses such a beverage dispensing valve. However, it has been found that various problems of sealing exist in this type of valve construction, particularly, in the flow passages for the carbonated water and that more adjustment over the flow of carbonated water needs to be had in order to assure a high quality of beverage dispensed therefrom. It has also been found that some dispensing problems exist in the rate at which drinks can be dispensed and in the amount of foaming often present in the dispensed drink. A more positive control and indication of position is also desired in the flavor selector control to assure reliability in selection and operation.

Accordingly, an important object of the present invention is to provide an improved beverage mixing and dispensing valve of the aforementioned type.

Another important object of the present invention is to provide a mixing valve for dispensing carbonated beverages in which the flow rates may be conveniently and reliably adjusted to provide for quality and consistency in the dispensed products.

Yet another important object of the present invention is to provide a beverage mixing and dispensing valve having improved sealing of fluid passages to prevent improper mixing and otherwise leaky dispensing.

Still another important object of the present invention is to provide a beverage mixing and dispensing valve which has a rapid dispensing rate yet minimizes foaming.

SUMMARY OF THE INVENTION

The above objectives are accomplished according to the present invention by providing a mixing and dispensing valve wherein an improved fluid mixing valve is provided having an adjustable metering rod carried in a reciprocating valve stem of the mixing valve. Leakage of syrup passages is prevented by a positive pinching off action of valve tubing through which the syrup flows. Accurate control of the admission of mixing fluid and syrup into the mixing and dispensing chamber is achieved to control the quality and consistency of the dispensed beverage. An enlarged mixing and dispensing nozzle is provided whereby foaming of the dispensed beverage is reduced even with faster rates of dispensing.

BRIEF DESCRIPTION OF THE DRAWINGS

The construction designed to carry out the invention will be hereinafter described, together with other features thereof.

The invention will be more readily understood from a reading of the following specification and by reference to the accompanying drawings forming a part thereof, wherein an example of the invention is shown and wherein.

DESCRIPTION OF A PREFERRED EMBODIMENT

The invention relates to a mixing and dispensing valve for automatically dispensing a carbonated beverage by mixing a flavored syrup and carbonated water and dispensing the mixture for serving in an individual container. Since the details and operation of a carbonator for producing the carbonated water and maintaining same chilled and the arrangement of syrup containers all for being delivered to such a valve device are well known in the art, only those parts of the carbonator and fluid packages as are necessary to an understanding of the invention are illustrated herein.

Figure 2:
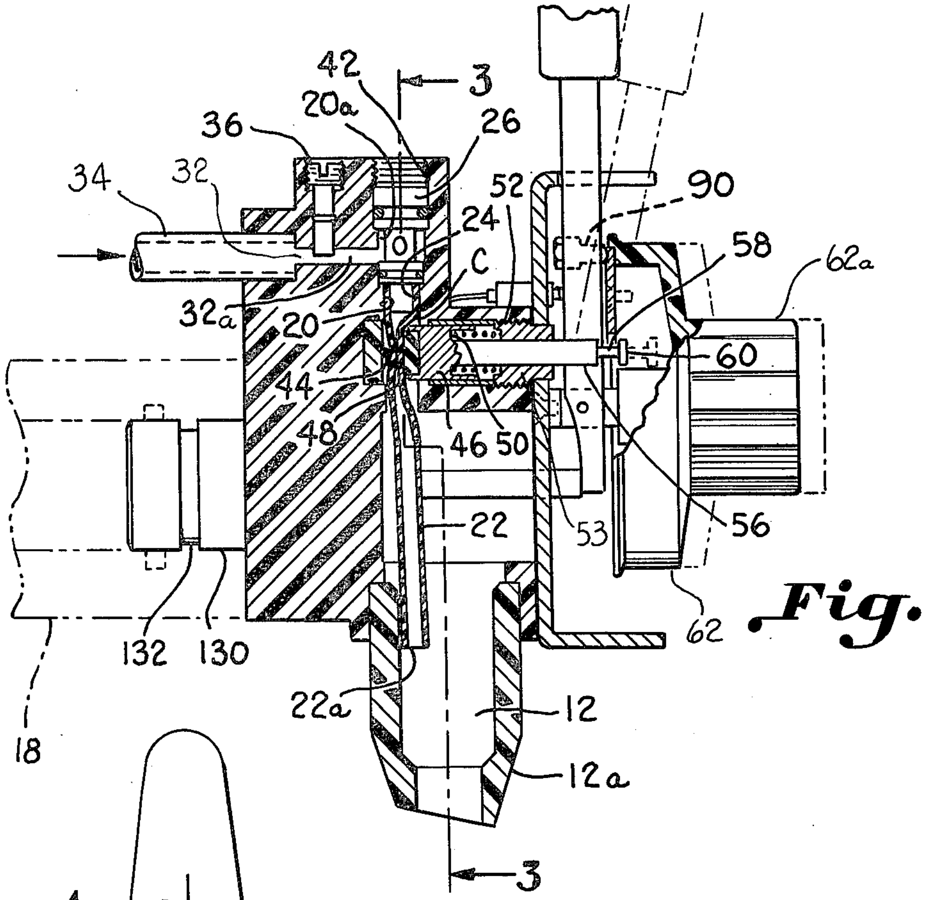
FIG. 2 is a sectional view taken along line 2—2 of FIG. 1.
Figure 1:
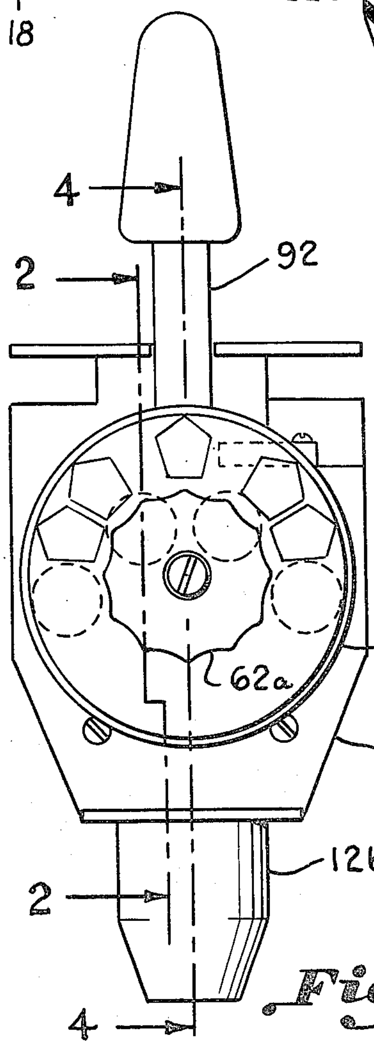
FIG. 1 is a front elevation illustrating a beverage mixing and dispensing valve constructed according to the present invention.
Figure 3:
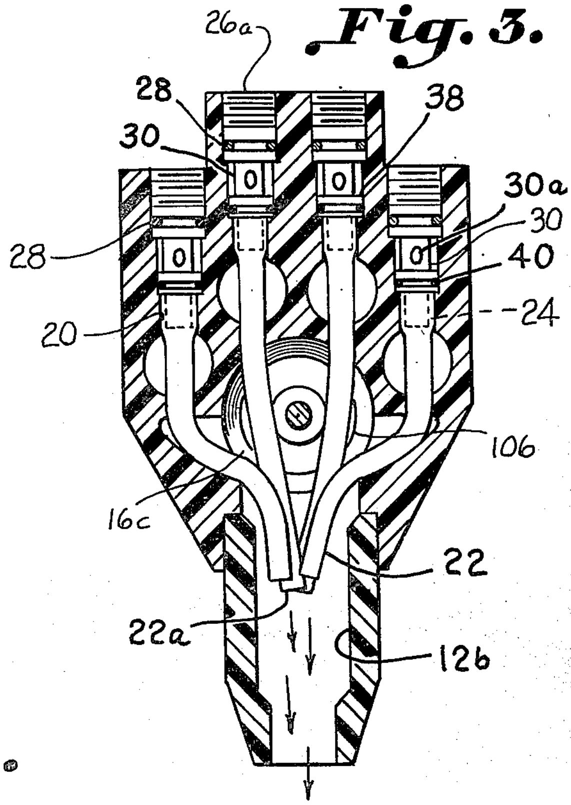
FIG. 3 is a sectional view taken along line 3—3 of FIG. 2.

Accordingly, FIG. 1 illustrates a valve device, designated generally as A, constructed according to the present invention which includes a housing 10 constructed from a suitable material such as nylon. The housing is machined or molded to include a beverage mixing and dispensing chamber 12 having a lower outlet dispensing nozzle **12*a* through which the mixed product is dispensed into a cup. The housing further includes an entrance port which includes a horizontal port passage 16, an entrance port inlet 16*a*, and a frusto-conically shaped entrance port outlet 16*b* which tapers outwardly and opens into the mixing chamber 12. A valve member B which will be described in more detail hereinafter controls the flow of mixing fluid through the entrance port. The entrance port inlet 16*a* is connected to an inlet 14 of a source of mixing fluid such as carbonated water by any suitable conduit such as the conduit illustrated at 18**.

The housing 10 further includes vertical passages 20 machined or molded therein. There are four passages shown here. In each passage 20 is a flow control means C for controlling a flow of fluid such as flavored syrup therein. Flow control means C includes a length of flexible tubing 22 extending through the passage 20 having its lower end arranged as an outlet **22*a* in a lower portion of the mixing and dispensing chamber 12 well beyond the carbonated water entrance at 16*b*. The upper end of the flexible tubing 20 is fitted about a nipple 24 of a valve holder 26 which holds the valve tube 22. Each passage 20 includes an enlarged portion 20*a* in which the valve holder is fitted. Part of enlarged portion 20*a* is threaded at 42 to receive a threaded cap 26*a* which holds the valve and tubing in place. The valve holder further includes an O-ring 28 fitted beneath the threaded cap 26 in a annular groove thereof and a reduced stem portion 30 having an inlet port 30*a* formed therein. The reduced stem portion is disposed in a space which forms a passage and communicates and corresponds with an inlet port 32*a* of a horizontal inlet passage 32 which is connected to a syrup package (not shown) by way of tubing 34. In the passage 32 is arranged an adjustable screw 36 which controls the velocity of flow of the syrup through the passage 32*a* by varying the amount of inward extension of the adjusting screw to more or less restrict the effective size of the passage 32. The tube holder 26 further includes a widened flange beneath the reduced inlet portion 30 which is fitted with a further sealing O-ring member 40**.

Flow control means C further includes a ridge and a reciprocating plunger for pinching valve tubing between the ridge. As illustrated a section of the valve tubing 22 rests against ridge means having a raised ridge 44 formed in a wall of the passage 22. Operating valve plunger 46 is carried in a horizontal passage formed in the housing 10 for controlling the flow of syrup through the valve tube 22. The plunger 46 may be formed of any suitable material such as nylon. Each valve plunger 46 is formed with a head portion 48 having a relative large diameter and a recess portion 50. A coil spring 52 is carried within and bearing against the back of the recess portion 50 and against the back side of a base portion 53 which is carried in a closure plate 54 at the opposite end. The coil spring 52 normally urges the valve plunger 46 against the tubing which pinches the same between the head of the plunger and the ridge 44 for maintaining the valve tubing passage closed. By means of the ridge 44 a positive pinching and clamping action is effected of the valve tubing to positively close the tubing and prevent flow therethrough. This prevents accidental leakage of the flavored syrups into the dispensing chamber which may be admitted in an improper mixture or dripping from the dispensing nozzle when not in use.

There are four passages 20 and 48, and four plunger valves 46, one each for each section of valve tubing 22. The valve A is shown as a four flavor valve.

A valve stem portion 56 is carried by each plunger 46 and carries at its end a reduced neck portion 58 and an enlarged head portion 60.

A selector plate 62 and operating knob 62*a* are rotatably carried on a stud 64 which has one end fixed to the closure plate 54 by any suitable means such as a screw. The outer end of the selector knob 62*a* includes a bore 66 in which a threaded cap nut 68 is carried and fits about a threaded post 64*a* of the stud. A compression spring 70 is carried between the threaded nut cap 68 and a shoulder 66*a* of the bore 66. Thus, the selector knob 62 is carried tightly for rotation on the stud 64.

The selector plate 62 carries a cam plate D for actuating any one of the four plunger valves 46. The cam plate D includes open ended slots 72 and 74 formed on either side of a pair of ear portions 76 between which extends an arcuate cam portion 78. An arcuate bridge 80 circumscribes a portion of the circumference of the selector plate and includes four notches 82, 84, 86, and 88 which correspond to the position of the four valve plungers 46*a*, 46*b*, 46*c*, and 46*d* when indexed by a post 90. The post 90 is carried by an operating lever 92 and fits within a particular notch depending on the position of the selector knob 62 so that a positive indication is given that the selector knob is at a corresponding position so that cam plate D engages a desired syrup valve plunger. To actuate and pull out a particular valve plunger 46, the back side of the enlarged head 60 of the plunger is either engaged by the surrounding surfaces of either open slot 72, 74 or by the face surface of the cam portion 78 as will be hereinafter set forth.

Slot 72 provides a first camming portion which actuates plunger 46*a*. Arcuate portion 78 provides a second camming portion which actuates plungers 46*b* and 46*c*. Slot 74 provides a camming portion which actuates plunger 46*d*.

Figure 4:
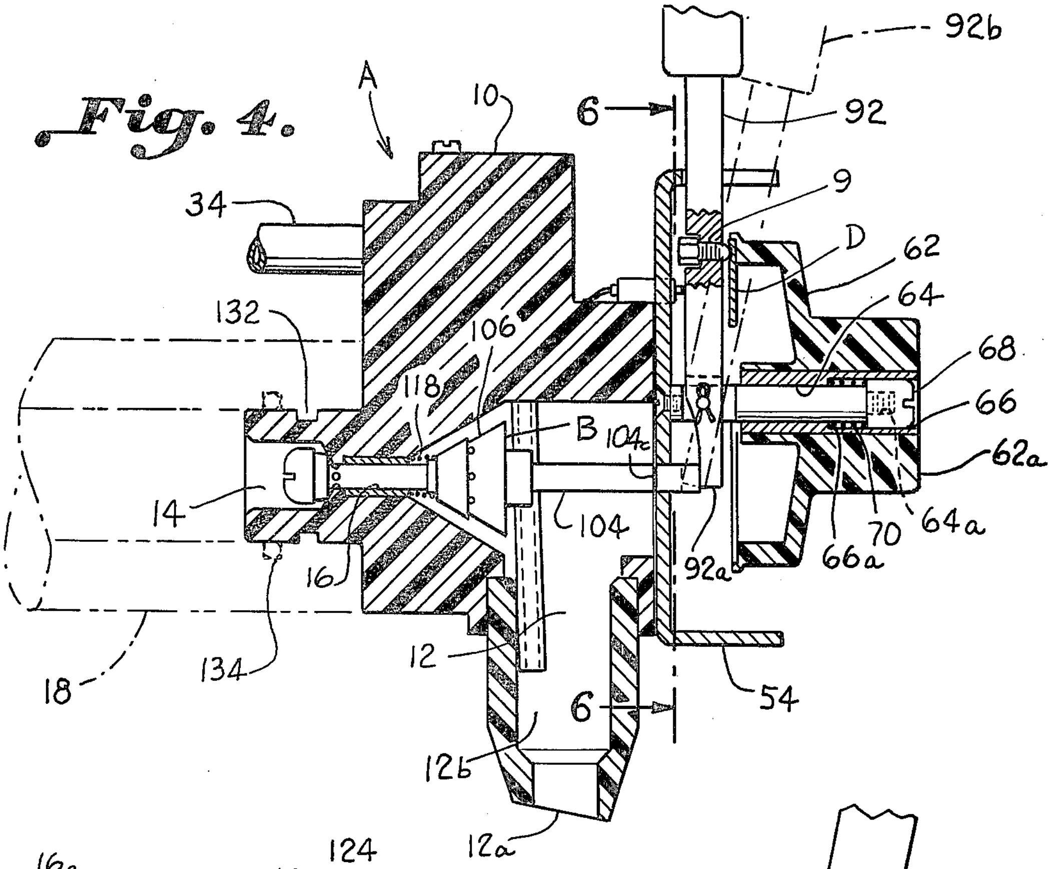
FIG. 4 is a sectional view taken along line 4—4 of FIG. 1.
Figure 5:
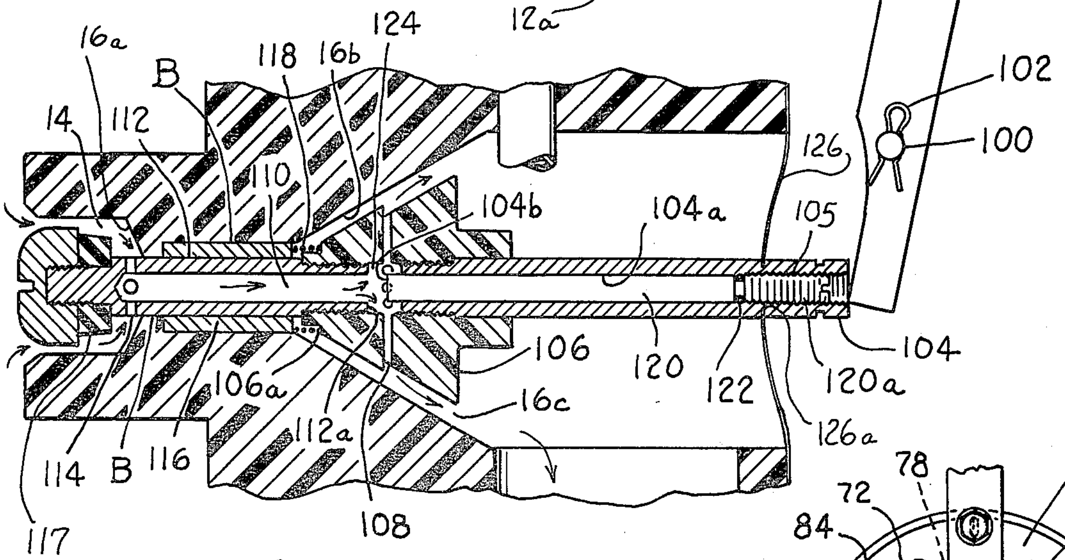
FIG. 5 is an enlarged sectional view of the carbonated fluid adjustment means constructed according to the present invention.
Figure 6:
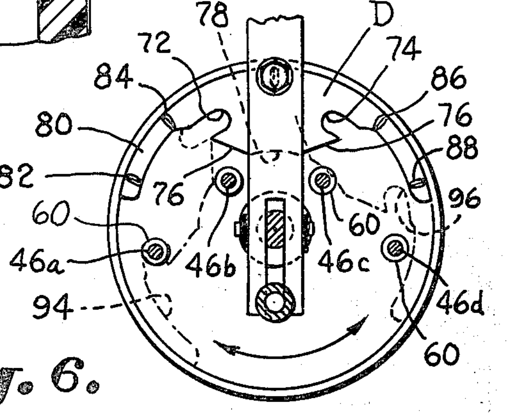
FIG. 6 is a sectional view taken along line 6—6 of FIG. 4.

In operation, in the extreme left most position, post 90 engages in notch 82 and the left most slot 72 will engage behind the head of valve plunger 46*a* as shown in the dotted line position 94. With post 90 received in notch 84, the face surface of the cam portion 78 will fit behind the enlarged head of valve plunger 46*b*. With the post 90 received in notch 86, the arcuate cam portion 78 will fit behind the enlarged head 60 of valve plunger 46*c* as shown in dotted line position 96. Finally, at notch position 88, the right slot 74 will fit behind the enlarged head 60 of the valve plunger 46*d*. With the cam plate so positioned in any one of the positions described above, pulling of the operating lever 92 to the right, as best seen in FIG. 4, will pull the valve plunger to the right. This relieves the pinching of the valve tubing 22 between the head of the plunger and the ridge 44 to allow syrup to flow through the valve tubing 22. With the operating lever 92 in the straight up position as shown in FIG. 6, none of the syrup plungers are engaged and operated by cam plate D and only carbonated water is dispensed by the pulling of the lever to the right as will be more fully explained herein.

It will be noted that operating lever 92 pivots about a pin 100 carried through a cut-out portion of stud 64 such that the end 92*a* of the lever, which is provided in the form of a fork, straddles the stud 64 and receives the pivot pin 100 therethrough which is secured by a cotter type pin 102. In pivoting about pin 100, the operating lever 92 engages a stem 104 of valve member B. Stem 104 is fitted within a frusto-conically shaped ported member 106 which corresponds generally to the shape of the outlet 16*b* of the entrance port in the mixing and dispensing chamber 12, but is reduced somewhat to provide a passage 16*c* at the outlet of the entrance port. Ported body member 106 includes first port means consisting of a plurality of entrance ports 108 which communicate with the outlet side 16*b* of the entrance port and an interior passage 110 formed in a body member 112. Passage 110 communicates at its opposite end with the inlet side 16*a* of entrance port 16 via second port means which includes a plurality of ports 114. Ports 114 are formed in the body 112 which slides in a bushing 116 in the horizontal passage 16.

A compression spring 118 carried between a shoulder 106*a* of body 106 and the edge of bushing 116 forces the valve member B to the right under normal conditions such that the inlet ports 114 are sealed from the passage 14 by the seat of inlet 16*a* and sealing head 117 and no flow is permitted through the valve body. However, with the operating lever 92 pulled out to the right as shown in dotted line positions 92*b*, end 92*a* pushes the valve member B to the left whereby the ports 114 communicate with the inlet passage 14 to allow for a flow of carbonated water or other mixing fluid through the passage 110 and outwardly through the outlet ports 108 into the mixing chamber 112 via passage 16*c*.

A threaded rod 120 is carried in an interior bore 104*a* of stem 104 and includes an O-ring 122 at one end thereof for sealing the bore 104. The bore is threaded at 105. Rod 120 includes a threaded head 120*a* by which the position of the metering rod 120 may be adjusted to more or less vary the space 124 between a shoulder 112*a* of the body 112 and the end 104*b* of the metering rod. By varying the space 124 the flow rate of the carbonated water through the passage may be varied to provide the proper ratios between the carbonated water and syrup for proper mixing and drink taste. The valve body 106 of valve member B is preferably machined from nylon or any other suitable plastic material similar to the housing 10.

A thin diaphragm seal member 126 is carried across an opening of mixing chamber 12 between housing 10 and front plate 54 being constructed of resilient latex or other rubber like material. Diaphragm 126 includes an aperture 126*a* through which valve stem 104 extends. Edges of aperture 126*a* fit tightly in an annular groove 104*c* of stem 104 forming a good seal. As the valve stem reciprocates left and right during operation, the diaghragm travels with the stem and flexes to seal the mixing chamber 12.

It will be noted that the outlet ends 22*a* of the valve tubing 22 extend well below the outlet 16*b* of entrance port 16. For this purpose, the mixing and dispensing portion 12*b* of the nozzle of the mixing and dispensing chamber is elongated such that the syrup from a particular valve tubing 22 is dispensed well below the entrance of the carbonated water at 16*c*. This allows for expansion and faster dispensing of the mixed syrup and carbonated water and also reduces the foaming of the dispensed drink. It being found that the prior arrangements wherein the syrup was dispensed directly into the entrance port for the carbonated water followed by passing through a restricted dispensing nozzle resulted in slow dispensing rates and excessive foaming.

For puposes of securing the dispensing valve A to an associated carbonator apparatus, a male fitting 130 is provided having a groove 132 for receiving a U-shaped locking pin fitting within two holes (not shown) of complimentary coupling 18 of the associated carbonator apparatus. Other suitable means for affixing the valve therein may also be utilized. An O-ring 134 carried in an internal groove of conduit 18 provides sealing between the connections.

While a preferred embodiment of the invention has been described using specific terms, such description is for illustrative purposes only, and it is to be understood that changes and variations may be made without departing from the spirit or scope of the following claims.

What is claimed is:

1. A valve device for mixing and dispensing beverages of the type which includes a housing having a mixing and dispensing chamber, an entrance port formed in said housing for the admission of a mixing fluid into said chamber, valve means controlling flow through said entrance port, and operator means for operating said valve means, wherein said device comprises:

a mixing and dispensing chamber wherein said mixing fluid and a flavored syrup are mixed for dispensing from said device;

a valve outlet communicating with said chamber for admitting said flavored syrup to said chamber;

said valve means including a ported valve body including first valve port means communicating with said chamber on an outlet side of said entrance port, and a second valve port means in fluid communication with a source of mixing fluid on an inlet side of said entrance port;

a flow passage formed in said valve body for delivering a flow of fluid from said second port means to said first port means;

a hollow valve stem carried by said valve body having an internal bore, a valve rod carried in said internal bore, said internal bore being open on both ends permitting adjustment and reciprocation of said rod lengthwise therein;

a space defined between said flow passage and an end of said valve rod; and means for adjusting the position of said end of said rod in said space to open and close said space and hence adjust the flow rate of said mixing fluid through said entrance port.

2. The device of claim 1 wherein said entrance port includes a frusto-conically shaped outlet opening into said mixing and dispensing chamber, said valve body including a frusto-conical body portion carried within said entrance outlet reduced in cross-section relative to the frusto-conical shape of said entrance outlet opening to define a passage between the wall of said entrance outlet and said frusto-conically shaped valve body through which said mixing fluid flows into said mixing and dispensing chamber.

3. The device of claim 2 including a biasing spring carried between a shoulder formed on said frusto-conically shaped valve body and said entrance port biasing said valve means to a closed position.

4. The device of claim 1 wherein said entrance port includes an inlet for delivering said mixing fluid to said second port means of said valve body, means connecting said entrance port inlet to a source of mixing fluid, a valve seat formed in said inlet, said second valve port means being closed from said inlet and said source of fluid by said valve seat when said valve means is closed.

5. The device of claim 1 including flow control means for controlling the flow of flavored fluid through said valve outlet, said flow control means including a section of flexible valve tubing, a reciprocating plunger in engagement with said valve tubing on one side thereof and a ridge means carried on another side of said valve tubing opposite said plunger including a raised ridge, said reciprocating plunger engaging said tubing forcing same against said ridge to positively pinch off and close the flow of fluid through said tubing.

6. The device of claim 5 wherein said operator means includes a pivotable lever carried by said device having a first end which may be manually grasped for pivoting said lever and a remote end which engages said valve stem of said valve means, a stud carried by said housing having a rotatable selector knob carried thereon, a cam plate carried by said selector knob having a plurality of camming portions, said reciprocating plunger of said flow control means including an enlarged actuating head which is engaged by one of said camming portions of said selector knob cam plate, and said operating lever being operatively connected to said selector knob to move said selector knob in an axial direction when said operator lever is pivoted to caused said plunger to be reciprocated when engaged by said camming plate.

7. The device of claim 6 wherein said operator lever includes a post extending outwardly therefrom, and said selector knob includes a plurality of position indicating notches engaged by said post to indicate the position of said selector knob at a corresponding one of said plungers.

8. The device of claim 7 wherein said cam plate includes an arcuate bridge circumscribing and carried by said selector knob, said position indicating notches being formed in said arcuate bridge, an intermediate camming portion carried by said bridge plate having an open ended slot formed at opposing sides thereof defined by said bridge plate and an ear of said intermediate camming portion, and said open ended slots and intermediate camming portions providing said camming portions by which said actuating heads of said reciprocating plungers are engaged for operation of said plungers.

9. The device of claim 1 wherein said valve outlet terminates in said mixing and dispensing chamber below said outlet of said entrance port.

10. The device of claim 9 wherein said mixing and dispensing chamber includes an enlarged portion beneath said entrance port in which said valve outlet is disposed.

11. A beverage mixing and dispensing valve comprising:

a housing;

a mixing and dispensing chamber formed in said housing in which a mixing fluid and mixed fluid are mixed having an outlet nozzle from which said mixture is dispensed;

an entrance port for the admission of said mixing fluid into said chamber;

valve means disposed in said entrance port for controlling the flow of said mixing fluid through said entrance port;

said valve means including a valve body having a first valve port means in fluid communication with said mixing and dispensing chamber on an outlet side of said entrance port, and a second valve port means communicating with a source of said mixing fluid on an inlet side of said entrance port;

a flow passage formed in said valve body intermediate said first and second valve port delivering a flow of fluid therebetween;

a hollow valve stem carried by said valve body having an internal bore, a valve rod carried in said internal bore, said internal bore being open on both ends permitting adjustment and reciprocation of said valve rod longitudinally therein, a space defined between said flow passage of said valve body and an end of said valve rod, and means for adjusting the position of the end of said valve rod in said passage to open and close said space and hence adjust the flow of said fluid through said space and said entrance port;

a valve outlet for admitting a flavored fluid into said mixing and dispensing chamber, said valve outlet disposed in said mixing and dispensing chamber substantially below said entrance port in said mixing and dispensing chamber;

flow control means for controlling the flow of flavored fluid through said valved outlet including a section of flexible valve tubing extending from a valve inlet to said valve outlet;

a reciprocating plunger carried in said housing in engagement with said flexible tubing on one side thereof and ridge means carried on an opposing side of said valve tubing opposite said reciprocating plunger including a raised ridge, said reciprocating plunger engaging said tubing forcing said tubing against said ridge to positively pinch off and close the flow of fluid through said tubing, and biasing means urging said reciprocating plunger against said tubing and said ridge;

operator means for operating said valve means and said flow control means simultaneously; and said mixing and dispensing chamber including an enlarged portion extending below said entrance port in which said mixing fluid and flavor fluid are mixed and dispensed.

12. The apparatus of claim 11 wherein a plurality of said valved ports and valve outlets are disposed in said housing each having a valve tubing extending between respective valve inlets and valve outlets, said apparatus further comprising:

a stud carried by said housing;

a rotatable selector knob carried on said stud;

a cam plate carried by said selector knob having a plurality of camming portions formed therein;

each said reciprocating plunger having an enlarged actuating head carried by said plunger which is engaged by one of said camming portions of said cam plate;

said operating means including a pivotable operating lever having a free end for manual operation and an opposing end which engages said valve stem of said valve means; a post carried by said operating lever extending outwardly therefrom;

a plurality of position indicating notches formed in said cam plate of said selector knob corresponding to the position of each of said actuating heads of said plungers and said camming portions which actuate respective ones of said plungers; and said operating lever engaging said valve stem and simultaneously engaging said selector knob to urge same axially when said selector knob is rotated to one of said positions for actuating a corresponding plunger to open one of said valve outlets simultaneously with the opening of said valve means.

13. The device of claim 12 wherein said camming plate includes an arcuate bridge circumscribing a portion of said selector knob having a first outermost camming portion consisting of an open slot for engaging a first of said actuator heads, a second intermediate camming portion having a camming surface for engaging a second or third of said actuating heads, and said intermediate camming portion terminating in a third outermost camming portion defined by a second open ended slot for engaging a fourth of said actuating heads.

* * * * *